US009877462B2

(12) United States Patent
Taneja et al.

(10) Patent No.: US 9,877,462 B2
(45) Date of Patent: Jan. 30, 2018

(54) PET FEEDING ROBOT . AUTOMATIC PET WET FOOD DISPENSER ROBOT

(71) Applicants: Meena Anurag Taneja, Naperville, IL (US); Bruce Anurag Taneja, Naperville, IL (US)

(72) Inventors: Meena Anurag Taneja, Naperville, IL (US); Bruce Anurag Taneja, Naperville, IL (US)

( * ) Notice: Subject to any disclaimer, the term of this patent is extended or adjusted under 35 U.S.C. 154(b) by 480 days.

(21) Appl. No.: 13/792,543

(22) Filed: Mar. 11, 2013

(65) Prior Publication Data

US 2013/0247829 A1    Sep. 26, 2013

Related U.S. Application Data

(60) Provisional application No. 61/609,934, filed on Mar. 12, 2012.

(51) Int. Cl.
*A01K 5/02* (2006.01)
*A01K 5/01* (2006.01)

(52) U.S. Cl.
CPC .......... *A01K 5/0291* (2013.01); *A01K 5/0114* (2013.01)

(58) Field of Classification Search
CPC .. A01K 5/0291; A01K 5/0114; B62D 7/2628; Y10S 901/02
USPC ................................ 700/24, 245; 119/51.11
See application file for complete search history.

(56) References Cited

U.S. PATENT DOCUMENTS

| | | | | | |
|---|---|---|---|---|---|
| 4,077,360 | A | * | 3/1978 | Figlia | .................. A01K 5/0291 119/51.12 |
| 7,107,123 | B2 | * | 9/2006 | Watanabe | ................. B65B 5/12 141/1 |
| 2012/0232891 | A1 | * | 9/2012 | Aoyama | ................. G10L 15/22 704/231 |
| 2015/0053138 | A1 | * | 2/2015 | Ramsey | ............... A01K 5/0291 119/61.5 |
| 2016/0037748 | A1 | * | 2/2016 | Taneja | ................. A01K 5/0291 119/51.11 |

* cited by examiner

*Primary Examiner* — McDieunel Marc (57) ABSTRACT

An automatic pet wet canned food dispenser robot has a robotic arm comprised of mechanical elements and motors, a can opener and a programmed microprocessor. The programmed microprocessor guides the robotic arm to grasp a food can and utilize the can opener to open the can and invert it and shake out the food contents into a bowl for a pet at predetermined times setup by the pet owner whose presence is not required at time of feeding.

16 Claims, 9 Drawing Sheets

| DISPLAY reading on local LCD or or a wired or wirelessly connected device: | Expected input for various input devices: | | |
|---|---|---|---|
| DISPLAY reads: | Repeated single button press on invention | Keypad on invention | Touchscreen or Smartphone or PC: |
| EVENT: FIRST TIME DEVICE STARTUP or on a DEVICE RECONFIGURE EVENT: | | | |
| Hi, I'm Alfred, I will feed your pet. First, please help configure me. | | | |
| Let's setup my clock. | | | |
| Please set hour: HH | Press button to advance hour | Type in hour | Type in hour |
| Please set minute: MM | Press button to advance minute | Type in minutes | Type in minutes |
| Now lets setup daily pet feeding config: | | | |
| Would you like to enable pet proximity serving option? | Press button to toggle between Yes or No | Press Yes or No button | Press Yes or No button |
| Would you like to enable empty bowl serving option? | Press button to toggle between Yes or No | Press Yes or No button | Press Yes or No button |
| Would you like to enable time based serving option? | Press button to toggle between Yes or No | Press Yes or No button | Press Yes or No button |
| Would you like me to take pictures and transmit them to you when I feed your pet? | Press button to toggle between Yes or No | Press Yes or No button | Press Yes or No button |
| EVENT: TIME BASED SERVING OPTION IS YES and we are configuring the device: | | | |
| First Feeding Hour: | Press button to advance hour | Type in hour | Type in hour |
| First Feeding Minute: (optional) | optional or as above | | |
| Number of cans to be served for 1st feeding: | Press button to advance quantity | Type in Quantity | Type in Quantity |
| 2nd Feeding setup Hour (optional) | Press button to advance hour or user can cycle hours till display says "NA" to skip this feeding. | Type in hour or select "NA" to skip. | Type in hour or select "NA" to skip. |
| 2nd Feeding Minute: (optional) | optional or as above | | |
| Number of cans to be served for 2nd feeding: | Press button to advance quantity | Type in Quantity | Type in Quantity |
| 3rd Feeding setup Hour (optional) | Press button to advance hour or user can cycle hours till display says "NA" to skip this feeding. | Type in hour or select "NA" to skip. | Type in hour or select "NA" to skip. |
| 3rd Feeding Minute: (optional) | optional or as above | | |
| Number of cans to be served for 3rd feeding: | Press button to advance quantity | Type in Quantity | Type in Quantity |
| 4th Feeding setup Hour (optional) | Press button to advance hour or user can cycle hours till display says "NA" to skip this feeding. | Type in hour or select "NA" to skip. | Type in hour or select "NA" to skip. |
| 4th Feeding Minute: (optional) | optional or as above | | |
| Number of cans to be served for 4th feeding: | Press button to advance quantity | Type in Quantity | Type in Quantity |

FIG. 4: Interface Sample Interaction

FIG 5: Alternate design for part 2RG – robot gripper for grasping food cans more firmly FIG 6: Rear perspective view with optional food can rack 3RCK FIG 7: Front perspective view showing lid removal using gripper only method FIG 8: Front perspective view showing lid removal using gripper vacuum method FIG 9: Front perspective view showing lid removal using gripper magnet method

PET FEEDING ROBOT . AUTOMATIC PET WET FOOD DISPENSER ROBOT

CROSS-REFERENCE TO RELATED APPLICATION

Ser. No. 14/454,070

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of automated pet food dispensers. More particularly, the present invention is in the technical field of automated dispensing of wet canned food to household pets.

There have been a number of inventions in automated and timed dispensing of pet food for pets like dogs and cats, as often pet owners need to leave their homes for work or for a weekend and need their pets fed when they are gone.

Challenge is most inventions on the market work well only for dispensing dry pet food. However, a large percent of pet owners prefer wet food since dry food contains very little moisture which can lead to dehydration in pets. Further, a large percent of pets prefer wet or moist food over dry food.

Almost all current inventions on market which dispense wet food require the pet owner to open hermetically sealed commercially available pet food cans and load their contents into various compartments of an automated dispenser hours or days in advance of when the food will be actually dispensed to pets. Such exposed wet food is susceptible to bacterial infection. Also open food attracts invertebrate pests, for example spiders, ants, flies, pill bugs which will infest food directly and lay eggs and indirectly infest food with their larvae. Finally open food could also attract mice, ants and create unhygienic contamination problems in homes or apartment buildings where pets and pet owners reside.

REFERENCES CITED

U.S. patent DOCUMENTS

| patent | Dated | Inventor | Limitations of Prior Art: |
|---|---|---|---|
| US-2008/0289580A1 | January 2010 | Krishna-murthy | Wet food needs to be manually loaded & gets exposed to air borne bacteria. |
| US-2005/0066905A1 | March 2005 | Morosin et. al. | Wet food loaded will go bad after ice packs have stopped providing sufficient cooling. Limited loading capacity. |
| US-4,077,360 A | March 1978 | Figlia; Anthony G | Single feed automated can dispenser. Sharp edges on can, not safe for pet feeding. |
| US-2012/0232891 A1 | September 2012 | Aoyama; Kazumi | Speech communication system and method, and robot apparatus; |
| US-7,107,123 B2 | September 2006 | Watanabe; Atsushi | will not open food cans Food dishing robot system; will not open food cans |
| US-2015/0053138 A1 | February 2015 | Ramsey; David | Automated pet feeding apparatus; has a later priority date; handles pouches only, not food cans. |
| US-2016/0037748 A1 | February 2016 | Taneja; Bruce | Requires leverage element to be installed by user on each pop top food can; |

PRIOR ART LIMITATIONS

All wet pet food dispenser prior arts, with exception of U.S. Pat. No. 4,077,360 by Figlia, require a pet owner to open the hermetically sealed cans many hours or days in advance of when the food will actually be served to their pets. The noted exception, U.S. Pat. No. 4,077,360 by Figlia, which opens the hermetically sealed can at time of serving, is limited to serving only 1 can which is not sufficient for pet owners looking for multiple food can servings at one time, or multiple food cans being served over a period of time. Further this noted art by Figlia serves the opened food can with sharp edges which could tear a pet's tongue or skin around the pet's mouth and hence the opened food can is not cafe for pets to cat out of.

SUMMARY OF THE INVENTION

The present invention relates to an automatic wet food dispenser which consists of a machine which further consists of a can opener, a programmed microprocessor and a mechanical arm driven by motors.

NASA's website defines a robot as a programmable, self-controlled device consisting of electronic, electrical, or mechanical units. In the present invention, a microprocessor and a mechanical arm are collectively referred to as a robot, where the microprocessor contains programming to determine when and where to position the mechanical arm in order for this invention to complete its function of opening a food can and serving the food without presence of a human being. Further, this function can be executed repeatedly at predetermined times without any human intervention at times of operation.

The programmed microprocessor instructs the mechanical arm to move a wet food can to an electrical can opener, which opens the wet food can. The microprocessor then instructs the mechanical arm to move the food can away from the can opener, optionally removes the lid of the opened food can and to serve the opened food from the can to a pet serving area. Please note the sequence of the actions after the food can has been opened is not important, for example, the lid of the opened food can could be removed first, then the food can could be moved to the pet serving area and then the food could be served from the can.

Please also note that the mechanical arm could be designed with various alternate designs, in which the position of motors and its various mechanical parts can be made and assembled differently, while still achieving the function of moving a food can. In fact, this mechanical arm need not look like a mechanical arm at all, and could be a mechanical machine with some similarity to a coffee or soda vending machine where cups or cans would slide with help of gravity or be moved by levers or by other mechanical means. The objective is simply to move a wet food can to an electrically powered can opener which cuts open the food can. After the food can's lid has been separated, this mechanical machine moves the food can away from the can opener and removes the lid. Finally, this mechanical machine empties the food can into a serving bowl, which could be done by mechanically grasping and inverting the food can and using a shaking motion to allow gravity to empty out the contents into a below placed bowl.

Since the hermetically sealed food can is opened just prior to the food can being dispensed, and not hours or days prior to the food being consumed, the present invention hence overcomes the prior arts' shortcomings related to hygiene noted earlier. Hence, this invention drastically reduces the risk of bacterial, bug and rodent infestation which is a threat to the health of pets and pet owners.

The microprocessor can be setup by the user to open and serve the canned pet food at certain times, intervals or a when certain events occur such as pet approaching the pet feeding area or when the previous bowl is empty or perhaps when a "dispense now" button is pressed.

Please note while this invention is primarily designed to serve canned food to pets, it can also serve canned food to disabled humans who could use such a device to serve human food to them at predetermined times.

BRIEF DESCRIPTION OF THE DRAWINGS

FIG. 4 is a sample device interface interaction

PARTS REFERENCE LIST:

| 2RM1 | Robot Shoulder Motor |
| 1MH | Microprocessor & Robot Base Motor Housing |
| 2RA1 | Robot Upper Arm |
| 3CB1 | Can Opener Blade |
| 2RM2 | Robot Elbow Motor |
| 3CB2 | Can Opener Base |
| 2RA2 | Robot Forearm |

-continued

PARTS REFERENCE LIST:

| 3CH1 | Can Opener Housing |
| 2RM3 | Robot Wrist Motor |
| 3CH2 | Can Opener Can Guide |
| 2RA3 | Robot pre-gripper Arm |
| 3CP | Can Platform |
| 2RM4 | Robot Wrist Rotate Arm |
| 4PC | Wet Food Can, also referred to as: Food Can |
| 2RG | Robot Gripper, also referred as: Gripper |
| 5WC | Wire Conduit |
| 3PS | Proximity Sensor to detect a pet |
| 6WS | Weight Sensor - for food bowl |
| 3CAM | Camera for pictures |
| 7iF | Interface User Display and Input |
| 3LEV | Can Opener Operation Lever |
| 3RCK | Can Food Rack - for stacking food cans |
| LID | Separated lid from Wet Food Can. |
| SCP | Suction Cup |
| VMTR | Vacuum, also referred as Vacuum motor |
| PIPE | Pipe element connecting Suction Cup to Vacuum |
| MAG | Magnet attached to Robot Gripper |
| Robot | Mechanical Arm, also referred as Robot Arm |

DETAILED DESCRIPTION OF THE INVENTION

Figure 1:
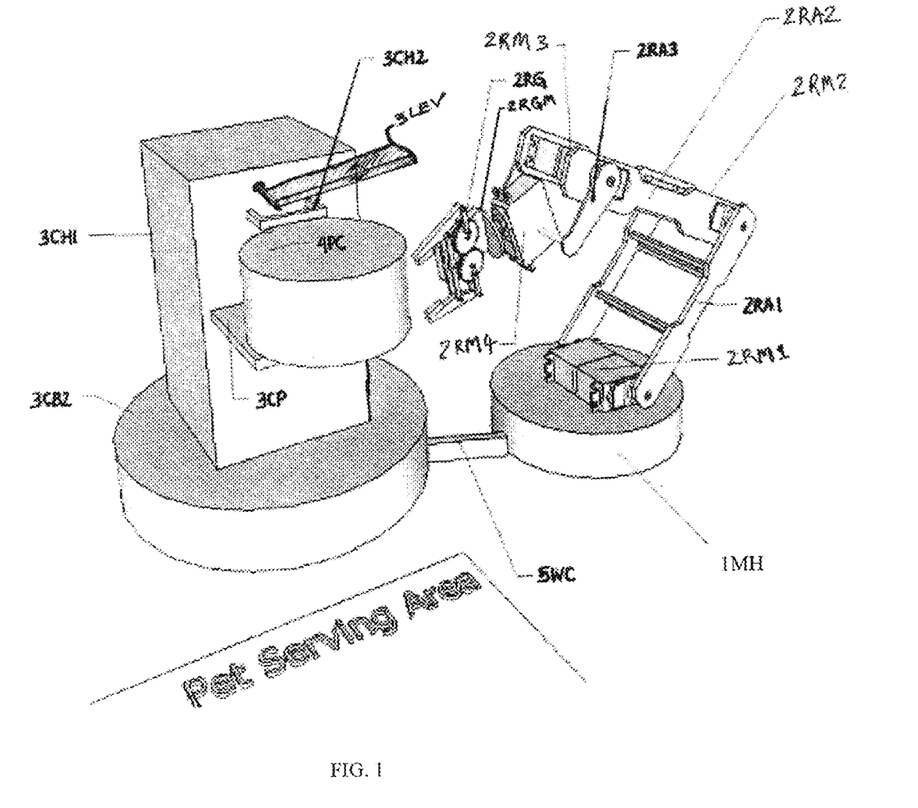
FIG. 1 is a perspective view of a front lower left side of the present invention
Figure 2:
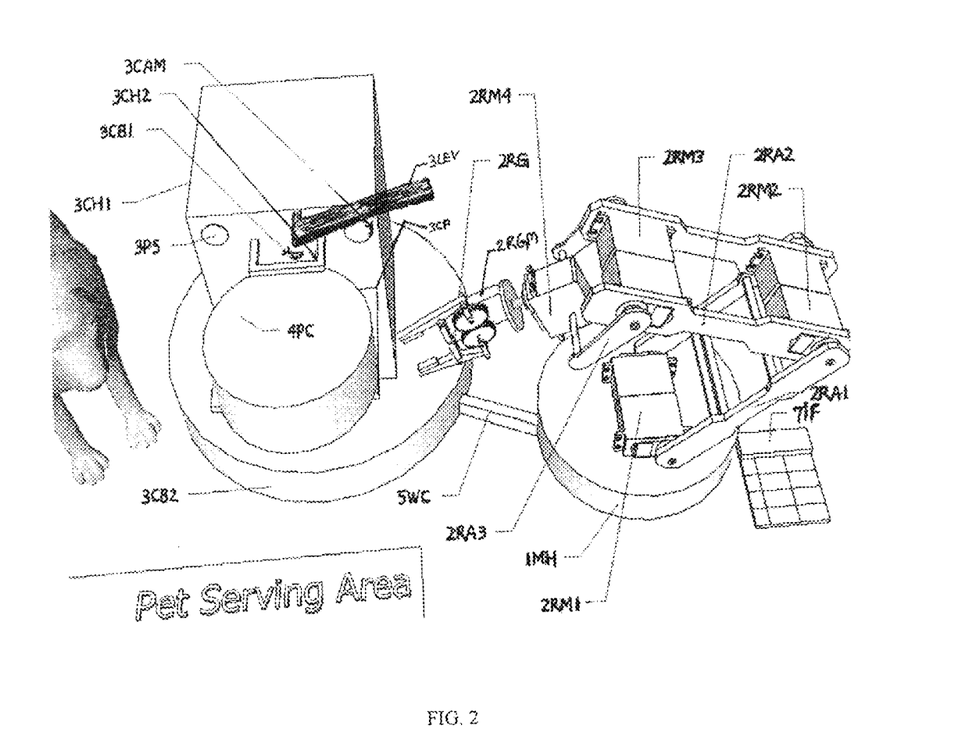
FIG. 2 is a perspective view of a front higher right of the present invention

Referring now to the invention in more detail, in FIG. 1 and FIG. 2, shown is the robot arm on the right and the can opener on the left. The robot arm has a round base housing 1MH, which contains the programmed microprocessor and the robot base motor (both these components are not shown in the figure). Please note there is nothing special about placement of the microprocessor, for e.g. instead of being placed in the 1MH housing, it could be placed in the can opener housing 3CH1 or under the 7iF user interface shown in FIG. 2 or any other enclosed part which is not exposed to the pet or the user of this invention. This is to prevent any accidental damage to the microprocessor.

The robot arm comprises of the robot motors 2RM1, 2RM2, 2RM3, 2RM4, 2RGM and 1MH to enable movement of its various arm components which are 2RA1, 2RA2, 2RA3 and 2RG. For example, motor 2RM1 will force arm 2RA1 to move back and forth depending on what degree turn signal is sent by the programming in the microprocessor. Motor 2RM2 turning motion as signaled by the programming in the microprocessor wired to all motors will cause arm 2RA2 to move up and down. Same logic applies to 2RM3 motor and 2RA3 arm combination. Motor 2RM4 rotates gripper 2RG. The gripper 2RG can be clamped tight on a food can or opened to release food can by motor 2RGM. Additionally, base housing 1MH motor's rotation allows the entire robot arm to rotate at its base. Hence, the robot arm can be moved around to a series of predetermined positions by programming in various angles required of each of the motors along with the timings and appropriate delays such as to create a various motions of the robot arm in order to perform the required functions.

Some of the arm components such as 2RA1, 2RA2 shown in FIG. 1 and FIG. 2 are in pairs but could be optionally designed with single arm components with more strength with no loss in functionality. The center line running through the motors are indicating that single or paired motors could be utilized between each arm component with no loss in functionality. Also the positions of motors could be interchanged. For example, the motor 2RM4, which rotates the robot gripper 2RG, could be optionally placed between 2RM3 and 2RM2 with no loss in functionality as now instead of rotating just the wrist, we would still rotate the wrist along with rotating the arm components 2RA2 and 2RA3, which is inconsequential since for example, the objective might be to rotate the gripper 2RG and the food can held by 2RG.

The can opener shown on the left side of FIG. 2, sits on its base 3CB2 with the can opener blade 3CB1 protruding from its housing 3CH1 in order to the cut open the wet food can 4PC. The can opener is powered optionally through the wire conduit 5WC and is very similar in design to the commercially available standard can openers. Additionally, this can opener could have a different body shape to optionally allow for holders for placing a stack of food cans and empty disposable bowls. However, the basic function of this can opener remains as described.

Figure 3:
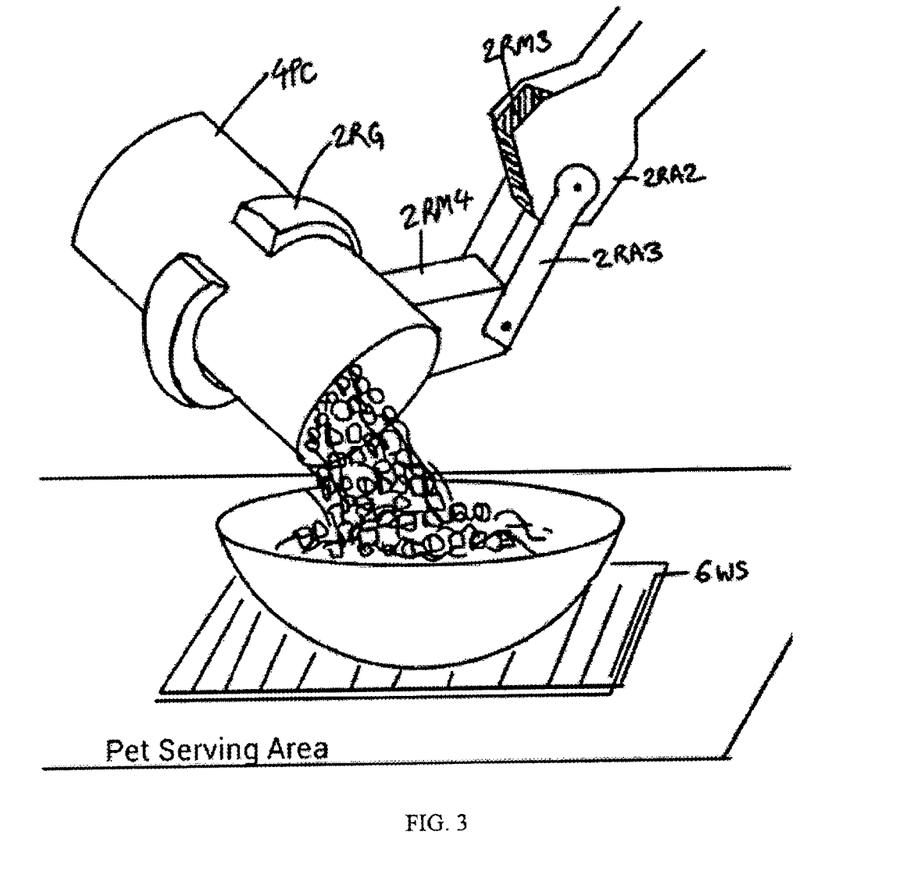
FIG. 3 is a partial perspective view of the present invention variation with robot gripper in rotated position to empty a food can
Figure 5:
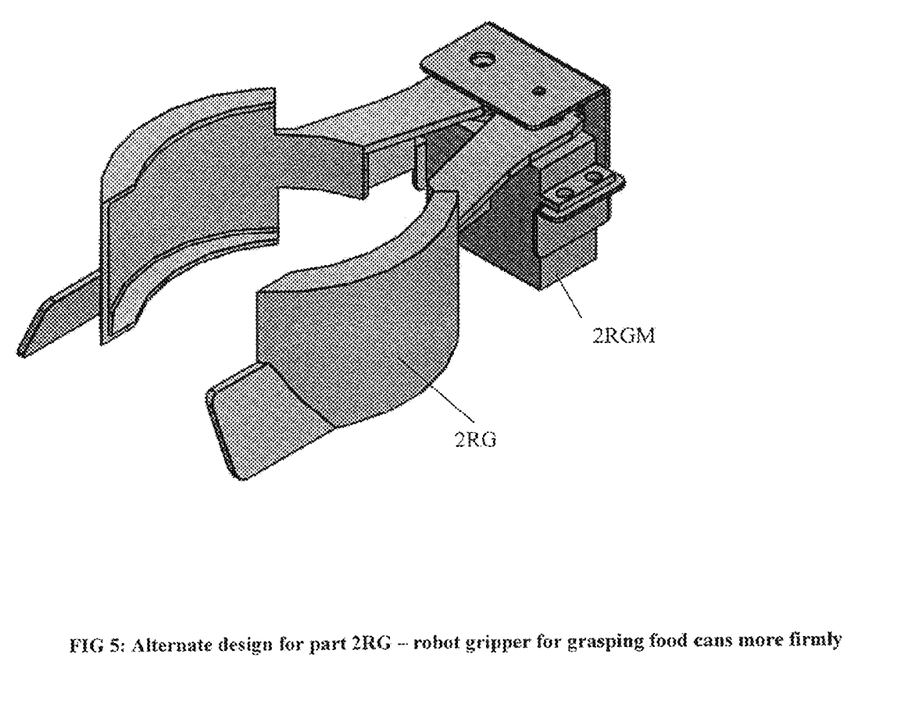
FIG. 5 is an alternate design for Robot Gripper of the mechanical arm which clasps the food can more firmly before moving it
Figure 6:
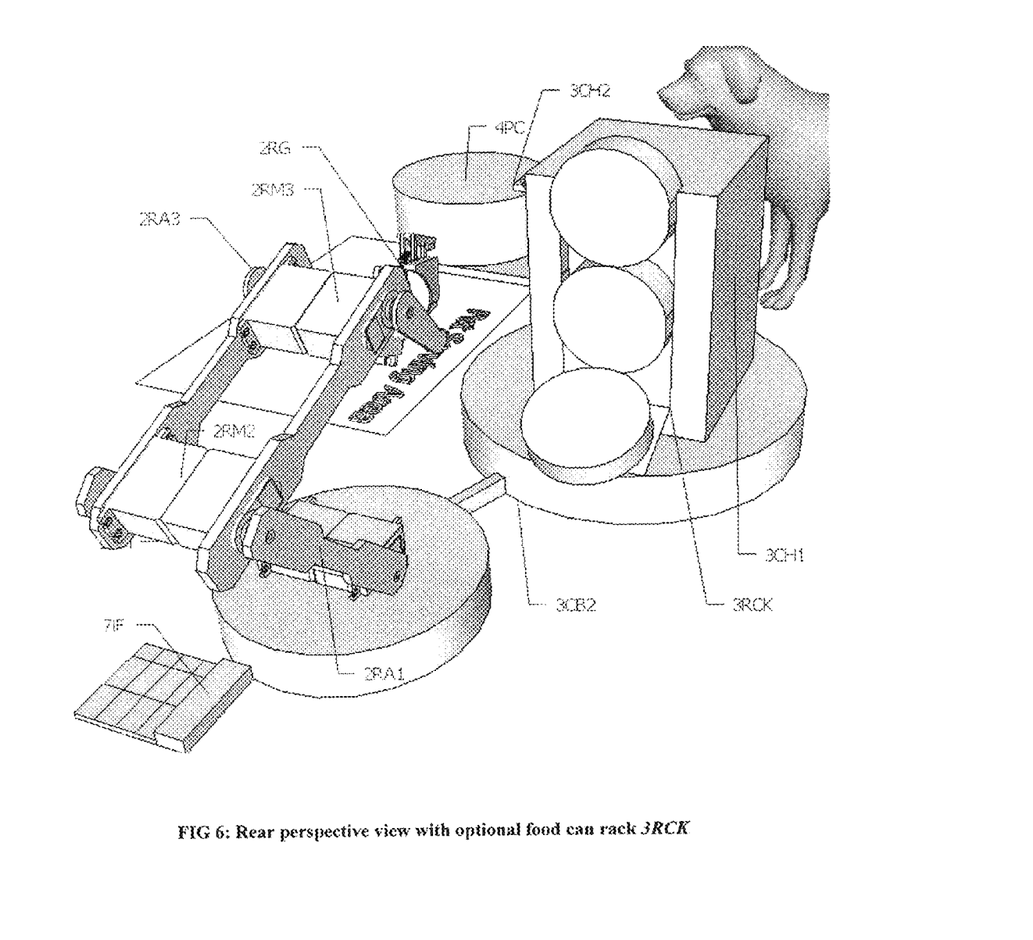
FIG. 6 is a perspective view from rear upper side of the present invention with an optional can rack which show the food can rack where a user can stack food cans which are accessible by the mechanical arm

The robot arm utilizes its gripper 2RG to grasp a food can from the optional food can rack 3RCK as shown in FIG. 6, and moves it and places it on the can opener platform 3CP as seen in FIG. 1. The height of platform 3CP can be adjusted, so the wet food can 4PC with varying sizes are at the correct position relative to the can opener blade 3C131, and the food can 4PC is held in correct vertical position and not too high or past the position of the optional can opener guide 3CH2. Once the lid of the food can is cut open, the robot gripper 2RG then moves the food can towards the pet serving area and removes the lid before serving the pet food to the pet in the serving area by emptying the contents into a bowl. The exact sequence of moving the can to pet feeding area and removal of can lid is not important and could be reversed or the can could be placed in an intermediate spot where the robot arm removes the lid, before continuing to move the food can toward pet feeding area to serve the food can contents by either serving the opened food can as is or by flipping the contents of the opened food can into a bowl as shown in FIG. 3.

Microprocessor in 1MH housing is programmed to control the amount of movements and times of movements for each of the various motors in the invention to create various desired actions and motions as noted of the robotic arm. This is possible as all target locations where the can is moved to and from are predetermined and are coded in the program run by the microprocessor.

As per the example menu shown in FIG. 4, the user of this invention can setup times or intervals or type of events of when the device will actually open and serve the canned food. Please note that FIG. 4 only shows a sample interaction and the interaction dialogue that will be seen by the user of the invention can be modified by updating the firmware programming on the device.

There can be a few different options of interfaces which can be implemented with this invention. These interfaces will used by the user of this invention to input desired options in order to setup the operation of this invention such s the number of cans to be served as a "single serving" and the times or intervals to serve the canned food. Such interfaces could include a single or multiple button keypads or a touchscreen on the invention itself. Interface can also be available over a wired or wireless connection to a computer or a handheld electronic device, such as a smartphone app. The microprocessor can then guide the opening and serving of pet food at certain times, intervals or when a certain event occurs such as pet approaching the pet feeding area or when the previously served bowl is empty or when a "dispense now" button is pressed by the pet owner or the pet on one of these interfaces.

In another variation of this invention, the can opener can be operated by either the robot gripper 2RG pushing down on the optional lever 3LEV on the can opener which would operate it similar to commercially available household electrical can openers to operate the can opener blade 3CB1 or by the programming in the microprocessor which signals a switch in the can opener housing to operate the can opener blade 3CB1.

A variation is also shown in FIG. 2, whereby the present invention will optionally have two peripherals: a weight sensor 6WS under the food bowl and/or a proximity sensor 3PS. There is nothing special about the locations of these two peripherals on the can opener housing as shown in FIG. 2, and these peripherals can also be installed elsewhere on the device, such as on the robot arm. The weight sensor can be calibrated to sense if the food bowl is empty. The proximity sensor can detect if a pet is approaching the feeding area. The programmed microprocessor can be programmed to direct the device to open and dispense a new can if any of these conditions are true:
  i. The food bowl is empty.
  ii. The food bowl is empty and current time is within predetermined feeding hours.
  iii. The food bowl is empty and a pet is approaching.

Instead of having a standalone can opener as shown, optionally, a small can opener could be mounted on a mechanical arm component such as 2RA2, or 2RG so that the mechanical arm could move itself over a food can, engage the mounted can opener, cut food can's lid, and then continue with lid removal and serving of contents into a bowl as explained before.

An optional camera 3CAM can take pictures and transmit the same to the pet owner's device such as a PC or phone to confirm to pet owner that food was served to the pet or a photo of the pet when the pet approaches the device or just a photo of surroundings at predetermined times.

Figure 7:
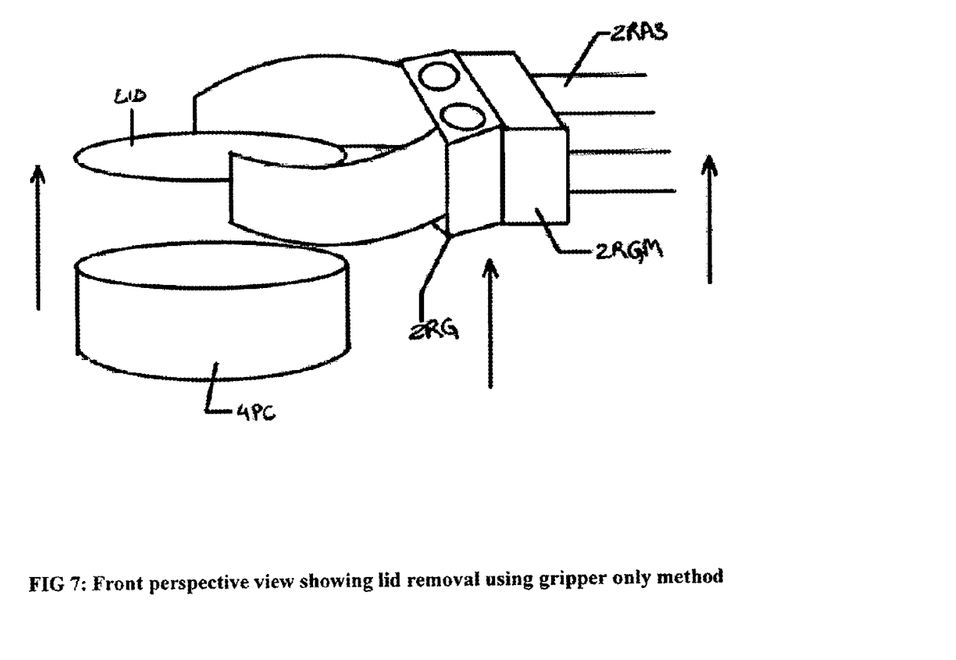
FIG. 7 is a front perspective view showing lid removal using gripper only method, whereby the mechanical arm lifts off the lid from the wet food can which has been cut open by the can opener.
Figure 8:
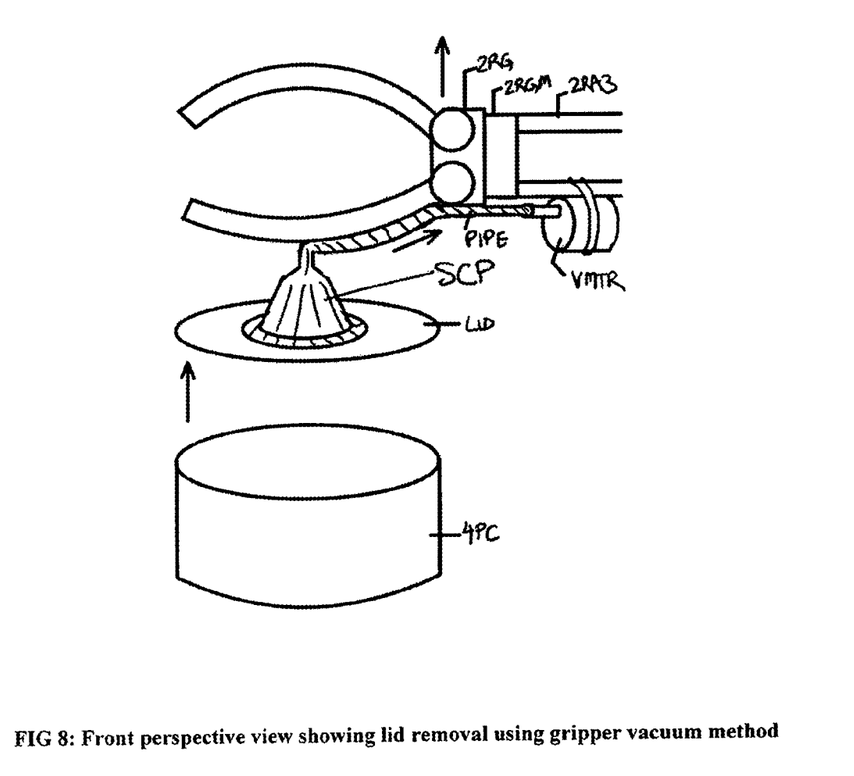
FIG. 8 is a front perspective view showing lid removal using gripper vacuum method, whereby the mechanical arm lifts off the lid from the wet food can which has been cut open by the can opener.
Figure 9:
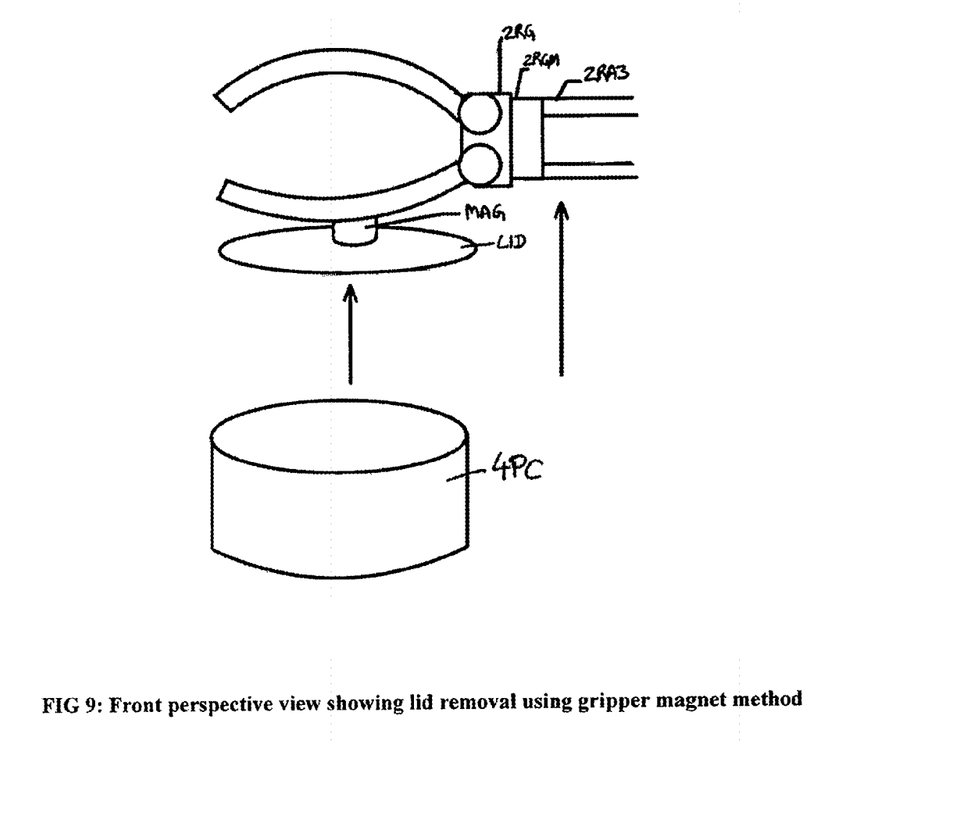
FIG. 9 is a front perspective view showing lid removal using gripper magnet method, whereby the mechanical arm lifts off the lid from the wet food can which has been cut open by the can opener.

Once the can opener has been separated the lid from the body of the wet food can, the actual lifting away of the lid from the body of the wet food can is optional and could be done in a number of alternate ways as noted below. Once the lid is removed using one of the methods noted below, the lid could be then dropped into a trash container or receptacle or any other pre-designated area.
  i. As in FIG. 7, the first method involves just using the robot gripper to grasp the edges of the cut lid (LID) and then the mechanical arm as a whole lifts the lid (LID) off the food can.
  ii. As in FIG. 8, the mechanical gripper could be mounted with a suction cup SCP. The suction cup is connected via a pipe to a vacuum VMTR. The mechanical arm will be guided in this case so the suction cup SCP is placed over the cut lid and the vacuum would attach the cut lid to the suction cup, and then the mechanical arm as a whole lifts the lid off the food can.
  iii. As in FIG. 8, the mechanical gripper could be mounted with a magnet MAG. The mechanical arm will be guided in this case so the magnet MAG is placed over the cut lid and the magnet MAG would attach to the cut lid, and then the mechanical arm as a whole lifts the lid off the food can.

Most of the base, housing and framing material used in both the can opener and the robotic arm could be injection molded plastic or metal. Most motors can be either off the shelf $3^{rd}$ party servo or stepper motors available from a number of vendors, and these motors can be controlled by the programmed microprocessor with precision. The motor which powers the can opener blade can be an AC or DC motor with sufficient power to turn the blade while cutting a wet food can. Other devices noted such as the camera, weight sensor and proximity sensor can be off the shelf products or can be custom built products which are capable of communicating with the microprocessor.

Suggested dimensions of the robots arm components 2RA1, 2RA2 are 2 to 6 inches long each, whereas the wrist arm 2RA3 could be 2 to 4 inches. However, these dimensions are changeable as long as the programming on the microprocessor is adjusted to accommodate the degrees by which each of the motors connected between these arms will be rotated in order to achieve the effect of moving the wet food can to and from the can opener as described earlier.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. An automatic wet food can opener and server machine, comprising
   a) a can opener further comprising cutting blade means for opening a hermetically sealed wet food can by separating the lid of said wet food can,
   b) a plurality of motors and elongated elements of predetermined lengths, wherein some of said elongated elements are connected to said motors so that said motors urge said elongated elements means for enabling physical movement of said wet food can to predetermined positions; said elongated elements means for emptying the contents of said wet food can into an empty bowl and
   c) a programmed processor commanding said motors' rotation means for urging said connected elongated elements to move to predetermined positions
   whereby said wet food can will be opened and contents of said opened wet food can will be served at predetermined dispense cycle invoking events without any human presence required.

2. The automatic wet food can opener and server of claim 1, wherein said plurality of servo motors and elongated elements comprising a mechanical arm guided by said programmed processor means for enabling physical movement of said wet food can to predetermined positions, and said mechanical arm further comprising a mechanical gripper means for grasping said wet food can.

3. The automatic wet food can opener and server of claim 2, wherein said mechanical gripper means for removing said separated wet food can's lid from body of said wet food can by grasping and lifting up said separated lid.

4. The automatic wet food can opener and server of claim 2, wherein said mechanical gripper further mounted with vacuum connected to suction cup means to attach said separated wet food can's lid whereby said mechanical arm guides said suction cup upwards removing said separated lid from wet food can's body.

5. The automatic wet food can opener and server of claim 2, wherein said mechanical gripper further mounted with magnet means to attach said separated wet food can's lid whereby said mechanical arm guides said magnet upwards removing said separated lid from wet food can's body.

6. The automatic wet food can opener and server of claim 1, wherein said elongated elements means for enabling inverting said opened wet food can over an empty bowl and shaking contents into an empty bowl.

7. The automatic wet food can opener and server of claim 1, further including a Interface user display input device means for displaying status and to allow user to enter dispense cycle invoking events for when a wet food can will be opened and served by the present device.

8. The automatic wet food can opener and server of claim 1, further including a wireless interface like Bluetooth and a smartphone application means for displaying status and to allow user to enter dispense cycle invoking events for when a wet food can will be opened and served by the present device.

9. The automatic wet food can opener and server of claim 1, further including a network interface and a website means for allowing user to use a web browser to enter dispense cycle invoking events for when a wet food can will be opened and served by the present device.

10. The automatic wet food can opener and server of claim 1, wherein said can opener can be signaled to cut said wet food can by said processor sending a signal to said can opener's electrical switch.

11. The automatic wet food can opener and server of claim 1, wherein said can opener can be signaled to cut said wet food can by said processor sending a signal to said motors to enable movement of said elongated elements to push down on a lever which further signals an electrical switch connected to said can opener.

12. The automatic wet food can opener and server of claim 1, further including a food can rack wherein the wet food cans are stored by user of the present device, wherein said plurality of motors and elongated elements remove said wet food can from said food can rack at predetermined time before being opened and served by the present device.

13. The automatic wet food can opener and server of claim 1, wherein said predetermined dispense cycle invoking event is a predetermined time.

14. The automatic wet food can opener and server of claim 1, wherein said predetermined dispense cycle invoking event is triggered by a food bowl weight sensor feedback to said processor wherein said processor determines food bowl is empty.

15. The automatic wet food can opener and server of claim 1, wherein said predetermined dispense cycle invoking event is triggered by an interface user display input device.

16. The automatic wet food can opener and server of claim 1, wherein some of said elongated elements form a curved gripper with upper and lower lips to enclose and firmly grasp said wet food can in any orientation.

* * * * *